United States Patent [19]

Borghard et al.

[11] Patent Number: 4,657,874

[45] Date of Patent: Apr. 14, 1987

[54] REDISPERSION OF AGGLOMERATED NOBLE METALS ON ZEOLITE CATALYSTS

[75] Inventors: William S. Borghard, Yardley, Pa.; Tracy J. Huang, Lawrenceville, N.J.; Sharon B. McCullen, Newtown, Pa.; Hans J. Schoennagel, Lawrenceville, N.J.; Ying-Yen P. Tsao, Langhorne, Pa.; Stephen S. Wong, Medford, N.J.

[73] Assignee: Mobil Oil Corporation, New York, N.Y.

[21] Appl. No.: 819,074

[22] Filed: Jan. 15, 1986

Related U.S. Application Data

[63] Continuation-in-part of Ser. No. 778,299, Sep. 23, 1985, abandoned, which is a continuation of Ser. No. 710,515, Mar. 11, 1985, abandoned, which is a continuation of Ser. No. 571,760, Jan. 18, 1984, abandoned.

[51] Int. Cl.$^4$ .................. B01J 38/42; B01J 38/44; B01J 29/38; C10G 35/095

[52] U.S. Cl. ..................... 502/35; 208/140; 502/37; 502/66

[58] Field of Search ............... 502/35, 37; 208/140

[56] References Cited

U.S. PATENT DOCUMENTS

| | | | |
|---|---|---|---|
| 3,134,732 | 5/1964 | Kearby et al. ............... | 502/36 |
| 3,986,982 | 10/1976 | Crowson et al. ............. | 502/37 |
| 4,018,670 | 4/1977 | Sinfelt et al. ............... | 208/139 |
| 4,444,895 | 4/1984 | Fung et al. .................. | 502/35 |
| 4,444,897 | 4/1984 | Fung et al. .................. | 502/37 |

FOREIGN PATENT DOCUMENTS

| | | | |
|---|---|---|---|
| 0142352 | 5/1985 | European Pat. Off. ........ | 502/37 |
| 2325289 | 4/1977 | France ....................... | 502/37 |
| 2106413 | 4/1983 | United Kingdom .......... | 502/37 |

*Primary Examiner*—P. E. Konopka
*Attorney, Agent, or Firm*—Alexander J. McKillop; Michael G. Gilman; Malcolm D. Keen

[57] ABSTRACT

A process is described for rejuvenation of a deactivated highly siliceous noble metal-containing zeolite catalyst having a framework silica to alumina ratio of at least about 20 which contains agglomerated noble metal in its deactivated state. The process comprises redispersing the noble metals associated with the deactivated catalyst by contacting the catalyst with a stream of inert gas containing molecular chlorine, water and optionally, oxygen, a temperatures ranging from about 150° to about 450° C., a partial pressure of chlorine of from about 6 to about 15 Torr and a ratio of partial pressure of water to partial pressure of chlorine of from about 0.01 to about 2 for a period of time sufficient to achieve redispersion; purging said catalyst with an inert gas; and reducing said purged catalyst in a stream of hydrogen at a temperature ranging from about 140° C. to 550° C.

23 Claims, No Drawings

REDISPERSION OF AGGLOMERATED NOBLE METALS ON ZEOLITE CATALYSTS

BACKGROUND OF THE INVENTION

Cross Reference To Related Applications

This application is a continuation-in-part of commonly assigned, copending U.S. patent application Ser. No. 778,299, filed Sept. 23, 1985, now abandoned, as a continuation of copending U.S. patent application Ser. No. 710,515 filed Mar. 11, 1985, now abandoned, in turn filed as a continuation of commonly assigned U.S. patent application Ser. No. 571,760 filed Jan. 18, 1984, also now abandoned.

FIELD OF THE INVENTION

This invention relates to a method of reactivating catalysts. In particular, it relates to the reactivation of highly siliceous noble metal-containing zeolite catalysts which have been deactivated as a result of agglomeration of their noble metals. Catalysts which can be reactivated by the process of the present invention include those that have become deactivated during hydrocarbon hydroprocesses such as the reforming of hydrocarbon feedstocks.

Discussion of the Prior Art

Reactivation of platinum catalysts utilized in hydrocarbon hydroprocessing procedures such as reforming is known in the art. Processes which utilize chlorine and oxygen in catalyst reactivation are well-known. For example, U.S. Pat. No. 2,906,702 discloses a method of restoring an alumina-supported platinum catalyst after deactivation occurring during the reforming of hydrocarbons. According to this method, a deactivated platinum-alumina catalyst is contacted with gaseous chlorine, fluorine, or other halogen or halogen-affording substance at an elevated temperature. U.S. Pat. No. 3,134,732 also describes a method for reactivating noble metal catalyst supported on alumina by contacting the catalyst with halogen-containing gas, stripping excess halogen therefrom and subjecting the resulting catalyst to a reduction step with a hydrogen-containing gas. In this disclosure, the agglomerated metal is present on the surface of the alumina as small crystallites. It is also known in the art to regenerate platinum group metal-containing zeolites catalysts. Regeneration of noble metal-loaded zeolite catalysts requires certain procedural modifications because the metal must be returned in a dispersed form within the zeolite pores. U.S. Pat. No. 3,986,982 describes a procedure in which deactivated platinum group metal-loaded zeolite is contacted with a stream of inert gas containing from 0.5 to 20 percent volume of free oxygen and from 5 to 500 ppm volume of chloride as chlorine, HCl, or an organic chlorine-containing material. The resulting catalyst is purged to remove residual oxygen and chlorine and then reduced in a stream of hydrogen at 200° to 600° C.

The regeneration of highly siliceous materials which contain noble metals has been found to be particularly difficult. For example, treatment of agglomerated platinum on silica using a variety of chlorine containing compounds with water and oxygen in an inert gas results in a large loss of platinum from the silica support. Similarly, the zeolite regeneration process of U.S. Pat. No. 3,986,982 described above has not been found suitable for use in the regeneration of highly siliceous zeolites, that is, zeolites having a framework silica to alumina ratio of at least about 20.

SUMMARY OF THE INVENTION

In accordance with the present invention, there is provided a process for rejuvenating a highly siliceous deactivated noble metal-containing zeolite catalyst. For purposes of the present invention, a highly siliceous zeolite can be defined as a zeolite having a framework silica to alumina ratio of at least about 20 or 30. The rejuvenation process redisperses noble metals which have become agglomerated as a result of their use as catalysts for a variety of hydrocarbon hydroprocesses. Dispersion is effected by contacting the deactivated catalyst with a stream of inert gas containing molecular chlorine and water at a temperature ranging from about 150° to about 450° C., a partial pressure of chlorine of from about 5 to about 15 Torr and a ratio of partial pressure of water to partial pressure of chlorine of from about 0.01 to about 2 for a period of time sufficient to achieve dispersion. The presence of oxygen in the inert gas stream is generally advantageous. Oxygen partial pressures of from 50 to about 500 Torr, and preferably from about 100 to about 400 Torr, are useful. The resulting product is then purged with an inert gas and subsequently reduced in a stream of hydrogen, e.g., at a temperature ranging from about 140° to 550° C.

The process of the present invention has been found to be effective even in rejuvenating highly siliceous zeolites of silica-alumina ratios greater than about 30, 40 or even 100. Although it is contemplated that the present invention may be employed with any highly siliceous zeolite, it has been found to be particularly useful with zeolites selected from the group consisting of zeolite Y, zeolite beta, ZSM-3, ZSM-4, ZSM-5, ZSM-5/ZSM-11 intermediate, ZSM-11, ZSM-12, ZSM-18, ZSM-20, ZSM-22, ZSM-23, ZSM-35, ZSM-38 and ZSM-48.

DESCRIPTION OF THE SPECIFIC EMBODIMENTS

The present invention is useful in reactivating noble metal-containing zeolite catalysts which have become deactivated during a hydrocarbon processing step. When it becomes apparent that a catalyst has become deactivated, the hydrocarbon processing step is stopped by terminating the flow of hydrocarbon feedstock. It is preferred that the reactor be purged of hydrocarbons by feeding a hydrogen stream therethrough. It is contemplated that temperatures of from about 300° to about 400° C. and pressures ranging from atmospheric to the operating pressure of the process may be used in the hydrogen purge.

The reactor can also be purged subsequently with an inert gas in order to remove the hydrogen. Suitable purge conditions include temperatures of from about 300° to about 400° C. and pressures of about 1 to 40 atm, using a stream of an inert gas such as nitrogen.

The catalyst can then be treated in an oxidizing atmosphere in order to burn off carbonaceous deposits such as coke as well as nitrogen or sulfur compounds present on the catalyst. Preferably, these pretreatment conditions are sufficiently mild enough to prevent any alteration in the crystal structure of the zeolite being treated. At this point, any remaining carbon dioxide can be purged from the reactor.

The redispersion of agglomerated noble metals on the zeolite then may be carried out at a temperature of about 150° to 450° C. and preferably from about 200° to about 400° C. The zeolite is contacted with a stream of inert gas optionally containing oxygen, at a partial pressure PChlorine of from about 6 to about 15 Torr, and preferably from about 8 to about 12 Torr, and water in a concentration of $$0.01 \leq \frac{P\text{Water}}{P\text{Chlorine}} \leq 2, \text{ and preferably}$$

$$0.1 \leq \frac{P\text{Water}}{P\text{Chlorine}} \leq 1$$

wherein PWater is the partial pressure of water and PChlorine is the partial pressure of chlorine for a period of time sufficient to effect redispersion of the noble metal. Contact time may range between about 1 and 10 hours, preferably about 2 to 5 hours. Following the redispersion step, the catalyst is purged with an inert gas such as nitrogen to remove residual oxygen (if present) and chlorine, and the temperature is adjusted as necessary. The purging can be carried out simply by stopping the flow of oxygen and chlorine and can be continued until monitoring of the effluent shows no further removal of oxygen and chlorine. Other inert gases suitable for use in purging include helium and argon.

After purging, the catalyst is reduced in a stream of hydrogen, optionally, dry hydrogen, at temperatures ranging from about 140° to about 550° C. Preferred reduction conditions include final temperatures ranging from about 200° to about 450° C., and pressures of from about 1 to about 40 atmospheres. Reduction time may be anywhere from about 1 to about 5 hours.

The zeolites which can be rejuvenated by the process of the present invention include large pore zeolites such as Zeolite Y, zeolite beta, ZSM-3, ZSM-4, ZSM-18, and ZSM-20, as well as medium pore zeolites such as ZSM-5, ZSM-11, ZSM-5/ZSM-11 intermediates, ZSM-12, ZSM-23, ZSM-35, ZSM-38, ZSM-48 and other similar materials.

Zeolite Y is described in greater detail in U.S. Pat. No. 3,130,007. The entire description contained within this patent, particularly the X-ray diffraction pattern of therein disclosed Zeolite Y, is incorporated herein by reference.

Zeolite beta is described in U.S. Pat. No. 3,308,069. That description, including the X-ray diffraction pattern of zeolite beta, is incorporated herein by reference.

ZSM-3 is described in greater detail in U.S. Pat. No. 3,415,736. That description, and in particular the X-ray diffraction pattern of said ZSM-3, is incorporated herein by reference.

ZSM-4 is described in U.S. Pat. No. 4,021,447. That description, and in particular the X-ray diffraction pattern disclosed therein, is incorporated herein by reference.

ZSM-5 is described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

ZSM-11 is described in greater detail in U.S. Pat. No. 3,709,979. That description, and in particular the X-ray diffraction pattern of said ZSM-11, is incorporated herein by reference.

ZSM-5/ZSM-11 intermediate compositions are described in U.S. Pat. No. 4,229,424. That description, and in particular the X-ray diffraction pattern of said compositions disclosed therein, is incorporated herein by reference.

ZSM-12 is described in U.S. Pat. No. 3,832,449. That description, and in particular the X-ray diffraction pattern disclosed therein, is incorporated herein by reference.

ZSM-18 is described in U.S. Pat. No. 3,950,496. That description, and in particular the X-ray diffraction pattern disclosed therein, is incorporated herein by reference.

ZSM-20 is described in U.S. Pat. No. 3,972,983. The entire content thereof, particularly the specification of the X-ray diffraction pattern of the disclosed zeolite, is incorporate herein by reference.

ZSM-23 is described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

ZSM-38 is more particularly described in U.S. Pat. No. 4,046,859. The description of that zeolite, and particularly the specified X-ray diffraction pattern thereof, is incorporated herein by reference.

ZSM-48 is more particularly described in U.S. Pat. No. 4,234,231, the entire contents of which is incorporated herein by reference.

The catalyst treated by the process of the present invention contains at least one noble metal such as platinum, palladium, iridium, osmium, rhodium, and ruthenium. These noble metals are generally associated and supported on a zeolite catalyst. The process can also be used to regenerate multimetallic catalysts which contain one of the above noble metals and another metal selected from Groups IB, IVB, VIAA, or VII of the Periodic Table. The zeolite catalyst treated can be binder free or it can contain an inorganic oxide binder such as alumina, silica, silica-alumina, magnesia, titania, zirconia, or thoria.

The following examples are further illustrative of the invention. All catalyst rejuvenation procedures were carried out at 1 atmosphere.

EXAMPLE 1

Preparation of 0.6% Pt/Zeolite Beta

An as-synthesized zeolite beta with a $SiO_2/Al_2O_3$ ratio of about 30 was calcined in flowing $N_2$ at 500° C. for 4 hours followed by air at the same temperature for 5 hours. The zeolite beta was then dealuminized to a $SiO_2/Al_2O_3$ ratio of about 200 by acid extraction. Platinum was introduced into the dealuminized zeolite via ion exchange of platinum tetraamine at room temperature overnight. Ion exchange of platinum was accomplished by contacting zeolite beta with $Pt(NH_3)_4(NO_3)_2$ at a ratio of 83:1 by weight. The platinum exchanged material was washed and over dried followed by air calcination at 350° C. for 2 hours.

EXAMPLE 2

Rejuvenation of Pt/Zeolite Beta in the Presence of $H_2O$, Chlorine and Oxygen 15 grams of 0.6% platinum/zeolite beta prepared in accordance with Example 1, were placed in a quartz reactor and heated to 450° C. at a rate of about 10° C.

per minute in a flow of nitrogen. Once the desired temperature was reached, water, chlorine and oxygen were introduced into the inert gas stream for four hours at partial pressures of 14, 12, and 40 Torr, respectively. After purging with nitrogen, the catalyst was reduced in flowing hydrogen at 450° C. for a period of about 1 hour. The hydrogen chemisoption was measured before and after treatment. As shown in Table 1, infra, the platinum dispersion was increased from 6 percent to 28 percent.

(COMPARISON) EXAMPLE 3

Rejuvenation of Pt/Zeolite Beta in the Absence of $H_2O$

The procedure of Example 2 is repeated except under moisture free conditions and in a steel reactor. Moisture free conditions are achieved by pre-drying the nitrogen and oxygen with 5 angstrom molecular sieve driers. Measurement of hydrogen chemisorption as shown in Table 1 below indicates that platinum dispersion increases significantly over that of Example 2 in which water is present. However, the moisture-free conditions under which rejuvenation is carried out results in an unacceptable degree of leaching of iron in the form of gaseous iron chloride from the walls of the reactor offsetting the advantage of increased platinum dispersion. Iron acts as a poison for the zeolite catalysts which can be rejuvenated in accordance with this invention.

TABLE 1

Platinum Dispersion

| Catalyst | Example 2 Pt/Zeolite-Beta | Comparative Example 3 Pt/Zeolite-Beta | Example 4 Pt/Zeolite Beta |
|---|---|---|---|
| Initial dispersion, $D_h$ | 0.06 | 0.13 | 0.20 |
| Final dispersion, $D_h$ | 0.28 | 0.60 | 0.52 |
| $PH_2O$, Torr | 14 | — | — |
| $PCl_2$, Torr | 12 | 12 | 12 |
| $PO_2$, Torr | 40 | 40 | — |
| Vol. % $Cl_2$ | .4 | .4 | .4 |
| Temperature, °C. | 450 | 450 | 450 |
| Total Pressure | 1 atm | 1 atm | 1 atm |

EXAMPLE 4

Conditions both outside those employed in the rejuvenating process herein, i.e., water is omitted, and within the rejuvenating process herein, i.e., with water present, were carried out in the presence of an iron sample to simulate the conditions which would occur were steel apparatus used to accomplish rejuvenation. The effects of the absence and the presence of water on removing iron from the sample (as iron chloride) is clearly evident from the data set forth in Table 2 below.

TABLE 2

Iron Loss (as Chloride)

| | Rejuvenating Conditions | | | Time/ | Sample Weight |
|---|---|---|---|---|---|
| Run | $Cl_2$, Torr | $O_2$, Torr | $H_2O$, Torr | min. | Loss, mg |
| 1 | 6.9 | 0 | 0 | 60 | 162.42 |
| 2 | 6.9 | 97 | 0 | 60 | 95.42 |
| 3 | 6.9 | 0 | 4 | 60 | 0.58 |
| 4 | 6.9 | 97 | 4 | 60 | −2.73 |

As these data show, the absence of water (runs 1 and 2) had a profoundly deleterious effect on weight loss with the presence of oxygen (Run 2) having only limited mitigating effect. However, when water was present, sample weight loss was negligible (Run 3) or, in the presence of oxygen (Run 4), even increased slightly due in all likelihood to formation of iron oxide.

EXAMPLE 5

A 65/35 weight ratio zeolite beta/alumina binder containing 0.62 weight platinum having a hydrogen chemisorbtion (H/Pt) value of 1.42 and an x-ray diffraction (XRD) value of 3% was divided into two samples A and B with each sample being employed in an isomerization dewaxing run for 21 days at which point significant coking (e.g., 15 to 20 percent by weight) had been observed.

After coke-burnoff in oxygen which also resulted in agglomeration of the platinum in both samples of catalyst, the H/Pt and XRD values for the samples were measured as follows:

| Sample | H/Pt | XRD, % |
|---|---|---|
| A | 0.25 | 33 |
| B | 0.21 | 34 |

These data indicate that considerable agglomeration of the platinum had occurred.

Thereafter the samples of catalyst were subjected to varying rejuvenation conditions with the results shown below:

| Sample | Rejuvenation Conditions | H/Pt | XRD, % |
|---|---|---|---|
| A | $Cl_2$, 10 Torr; $H_2O$, 50 Torr; $O_2$, 380 Torr; nitrogen at 450° C. for 4 hrs | — | 43 |
| B | $Cl_2$, 10 Torr; $H_2O$, 12 Torr; $O_2$, 380 Torr; nitrogen at 450° C. 4 hrs | 0.64 | 9 |

The data show that an amount of water in excess of the maximum tolerated by the present process aggravates the agglomeration of platinum.

EXAMPLE 6

A 65/35 zeolite beta/alumina catalyst containing 0.58% platinum was subjected to a real feed test for 21 days and the coked catalyst was given an oxygen burnoff treatment at 850° F. resulting in agglomeration of the platinum. The H/Pt and XRD values were measured after burnoff and after rejuvenation as follows:

| Rejuvenation Condition | H/Pt After Burnoff | After Rejuvenation | XRD, % After Burnoff | After Rejuvenation |
|---|---|---|---|---|
| $Cl_2$, 10 Torr; $H_2O$, 10 Torr; $O_2$, 380 Torr; nitrogen at 450° C. for 4 hr | 0.33 | 0.49 | 21 | 11 |

These data show the beneficial effect on carrying out rejuvenation with a partial pressure of water within the range of the invention.

EXAMPLES 7-9

The XRD values of the following zeolite beta catalyst samples were measured as follows:

| Example | Pt Loading | Zeolite/Binder Ratio | Original XRD |
|---------|------------|----------------------|--------------|
| 7 | 0.66 | 65/35 (alumina) | 0 |
| 8 | 0.58 | 65/35 (alumina) | 0 |
| 9 | 0.50 | 80/20 (silica) | 0 |

The XRD values of these zeolites following treatment(s) to agglomerate platinum were as follows:

| Example | Agglomerating Treatment | XRD, % Following Agglomeration |
|---------|-------------------------|--------------------------------|
| 7 | Air sintering at 530° C. for 24 hr | 27 |
| 8 | Coke burnoff | 9 |
| 9 | Real Feed Test (21 days) followed by coke burnoff and a repeat of these operations | 42 |

Rejuvenation was carried out on the agglomerated zeolites (with Example 7 being divided in two samples, 7A and 7B) and their XRD values were measured as follows:

| Example | Agglomerating Treatment | XRD, % Following Rejuvenation | Observation |
|---------|-------------------------|-------------------------------|-------------|
| 7A | Cl$_2$, 10 Torr; H$_2$O, 10 Torr; O$_2$, 380 Torr; nitrogen at 450° C. for 4 hrs | 7 | Substantial redispersion of platinum. |
| 7B | Cl$_2$, 5 Torr; H$_2$O, 10 Torr; O$_2$, 380 Torr; nitrogen at 450° C. for 4 hrs | 30 | Agglomeration somewhat aggravated; partial pressure of Cl$_2$ too low. |
| 8 | First Conditions: Cl$_2$, 12 Torr; H$_2$O, 27 Torr; O$_2$, 385 Torr; nitrogen at 450° C. for 2 hrs | 40 | HCl increases agglomeration. |
| 8 | Second Conditions: Cl$_2$, 6 Torr; H$_2$O, 39 Torr; O$_2$, 388 Torr; nitrogen at 450° C. for 2 hrs | 58 | Partial pressure of water exceeding maximum level increases agglomeration. |
| 9 | Cl$_2$, 10 Torr; H$_2$O, 11 Torr; O$_2$, 380 Torr; nitrogen at 450° C. for 4 hrs | 31 | Significant redispersion of platinum was observed. |

What is claimed is:

1. A process for rejuvenating a deactivated noble metal-containing zeolite catalyst in apparatus containing iron, said catalyst having a framework silica to alumina ratio of at least about 20 and containing agglomerated noble metal, which comprises dispersing said agglomerated metal associated with the deactivated catalyst by contacting said catalyst with a stream of inert gas containing molecular chlorine at a partial pressure of from about 6 to about 15 Torr and water in a concentration of $$0.01 \leq \frac{P\text{Water}}{P\text{Chlorine}} \leq 2$$

where $P$Water is the partial pressure of water and $P$Chlorine is the partial pressure of chlorine at elevated temperature for a period of time sufficient to achieve dispersion of the noble metal; subsequently purging said catalyst with an inert purging gas; and reducing said purged catalyst in the presence of dry hydrogen at elevated temperature.

2. The process of claim 1 wherein said catalyst is contacted with said stream of inert gas at from about 150° to about 450° C.

3. The process of claim 1 wherein reducing said purged catalyst is carried out at from about 140° to about 550° C.

4. The process of claim 1 wherein oxygen is present in said stream of inert gas.

5. The process of claim 4 wherein the partial pressure of oxygen in said stream of inert gas is from about 50 to about 500 Torr.

6. The process of claim 5 wherein the partial pressure of oxygen in said stream of inert gas is from about 100 to about 400 Torr.

7. The process of claim 1 wherein the partial pressure of chlorine is from about 8 to about 12 Torr.

8. The process of claim 1 wherein the concentration of water is $$0.1 \leq \frac{P\text{Water}}{P\text{Chlorine}} \leq 1.$$

9. The process of claim 1 wherein the framework silica-alumina ratio of said zeolite is at least about 40.

10. The process of claim 1 wherein the framework silica-alumina ratio of said zeolite is at least about 100.

11. The process of claim 1 wherein the framework silica-alumina ratio of said zeolite is about 200.

12. The process of claim 1 wherein said zeolite is selected from the group consisting of ZSM-5, ZSM-5/ZSM-11 intermediate, ZSM-11, ZSM-12, ZSM-22, ZSM-23, ZSM-35, ZSM-38 and ZSM-48.

13. The process of claim 1 wherein said zeolite is selected from the group consisting of zeolite beta, Zeolite Y, ZSM-3, ZSM-4, ZSM-18 and ZSM-20.

14. The process of claim 1 wherein said zeolite is zeolite beta.

15. The process of claim 1 wherein said zeolite is ZSM-5.

16. The process of claim 1 wherein said zeolite contains a metal selected from the group consisting of platinum, palladium, iridium, osmium, rhodium, and ruthenium.

17. The process of claim 1 wherein said zeolite contains at least two metals, at least one of which is selected from the group consisting of platinum, palladium, iridium, osmium, rhodium and ruthenium, and at least one of which is selected from the group consisting of Group IV, Group IVB, and Group VIIA.

18. The process of claim 1 wherein said zeolite catalyst contains about 0.01 to 10 weight percent platinum group metal.

19. The process of claim 18 wherein said zeolite catalyst contains about 0.1 to 3 weight percent platinum group metal.

20. The process of claim 1 wherein said metals are introduced to the zeolite by impregnation.

21. The process of claim 1 wherein said metals are introduced to the zeolite by ion exchange.

22. The process of claim 1 wherein said catalyst contains an inorganic oxide binder.

23. The process of claim 22 wherein said binder is selected from the group consisting of alumina, silica, silica-alumina, magnesia, titania, zirconia and thoria.

* * * * *